United States Patent

Engelhard

[11] 4,114,943
[45] Sep. 19, 1978

[54] WINDOW BOOT

[76] Inventor: Thomas Engelhard, 4325 Colfax Ave., South Minneapolis, Minn. 55409

[21] Appl. No.: 738,313

[22] Filed: Nov. 2, 1976

[51] Int. Cl.² .............................................. B60D 3/32
[52] U.S. Cl. .................................. 296/23 MC; 403/51
[58] Field of Search .................... 49/475; 403/50, 51, 403/134; 277/128, 101; 287/189.36; 296/23 MC, 23 R

[56] References Cited

U.S. PATENT DOCUMENTS

| | | | |
|---|---|---|---|
| 3,208,290 | 9/1965 | Mathues | 403/134 |
| 3,321,234 | 5/1967 | Harrell | 296/23 MC |
| 3,596,916 | 8/1971 | Gottschald | 403/51 |
| 3,837,700 | 9/1974 | Van Slyke | 296/23 MC |

*Primary Examiner*—Philip Goodman
*Attorney, Agent, or Firm*—Norman P. Friederichs

[57] ABSTRACT

A boot is provided which includes a resiliently deformable frame shaped to the respective contours of the rear window aperture of the truck cab and front window aperture in the forward wall of the camper. The opposite end walls of the frame terminate in respective continuous thickened lips which respectively snap-fit into corresponding channels provided in the cab and camper window frames. The boot is mounted in the respective window frames without adhesives, nails, screws, bolts or the like. It is also not necessary to remove either window to make the installation. Both windows remain slidable in their frames after installation, and the boot is easily removed therefrom.

3 Claims, 3 Drawing Figures

WINDOW BOOT

BACKGROUND OF THE INVENTION

The present invention relates generally to boots, and more particularly, to a boot of the type employed to provide an air corridor in the spacing between facing windows of a cab of a vehicle and, for instance, a recreational housing accessory mounted on the vehicle.

It has become desirable to provide a connecting passage between the cab and camper in the conventional truck-camper combination. Heretofore, this has been most usually achieved by removing the rear window pane from the cab of the truck and by removing the facing front window pane from the forward wall of the camper, and coupling the two window apertures by means of an open ended flexible boot. This type boot extending between the truck and the camper into the respective window apertures thereof and defining a passage therebetween.

It is thought to be undesirable to require removal of the window panes in the cab and camper for installation of the boot, even when the installed boot permits installation of the panes thereafter. Accordingly, the instant invention provides a boot that may be installed in the frame runners of the respective windows, without removal thereof.

SUMMARY OF THE INVENTION

Generally speaking, in accordance with the invention, a boot is provided which includes a resiliently deformable frame shaped to the respective contours of the rear window aperture of the truck cab and and front window aperture in the forward wall of the camper. The opposite end walls of the frame terminate in respective continuous thickened lips which respectively snap-fit into corresponding channels provided in the cab and camper window frames.

The boot is mounted in the respective window frames without adhesives, nails, screws, bolts or the like. It is also not necessary to remove either window to make the installation. Both windows remain slidable in their frames after the installation, and the boot is easily removed therefrom.

Accordingly, it is an object of the present invention to provide a novel boot assembly.

Another object of the invention is to provide a boot assembly which is releasably secured to the frames of the windows in the cab and camper without being fixed thereto.

Still another object of the invention is to provide a boot assembly for a cab/camper combination wherein the boot assembly may be installed without removing the windows, respectively, in the cab and camper.

Another object of the invention is to provide a boot assembly for a cab/camper which permits operation of the windows thereof, as before.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

BRIEF DESCRIPTION OF THE DRAWING

For a fuller understanding of the invention, reference is had to the following description taken in connection with the accompanying drawing, in which.

DETAILED DESCRIPTION OF THE INVENTION

Figure 1:
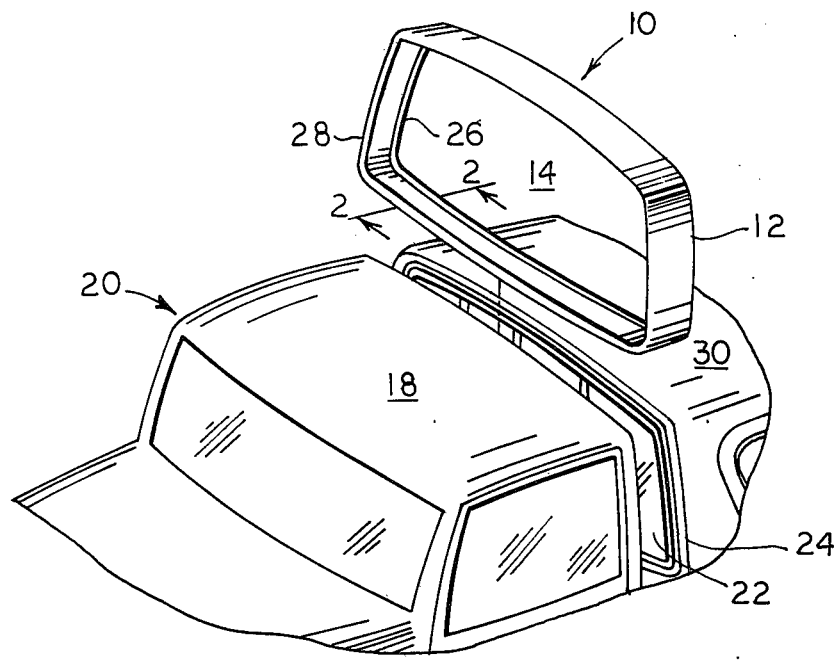
FIG. 1 is a perspective view of the boot constructed according to the instant invention.

Referring now to the drawing, the boot constructed according to the instant invention generally comprises a frame 10 including a resiliently deformable sidewall 12 which is continuous. The sidewall 12 defines an aperture 14 correspondingly registerable with a rear window 16 mounted in a cab 18 of the truck generally numbered 20, and a facing front window 22 mounted in the forward wall of a camper 24. The sidewall 12 terminates in a pair of opposite corresponding respectively continuous lips 26 and 28, and frame 10 is releasably mounted between cab 18 and camper 24 thereby, as hereinafter described in detail.

Figure 2:
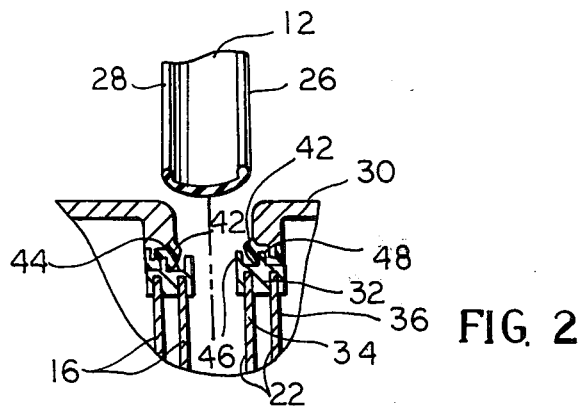
FIG. 2 is a fragmentary detail view of the invention taken along line 2—2 of FIG. 1.
Figure 3:
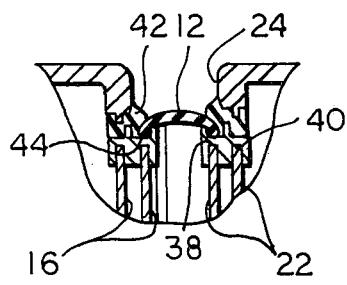
FIG. 3 is a top view of the detail seen in FIG. 2.

The cab 18 and the camper 24 are of conventional construction, and do not per se form appart of this invention. Mounted in the front facing of the camper housing 30 is a sash frame 32 for the window 22 which comprises first and second slidable panes 34 and 36, the panes 34 and 36 being slidable in adjacent runners 38 and 40 provided in frame 32. As best seen in FIGS. 2 and 3, the frame 32 is secured to the camper housing by weather stripping 42. A U-shaped channel 44 is formed on the top surface of frame 32 by corresponding adjacent flanges 46 and 48 upstanding therefrom.

One end of the weather stripping 42 is secured to the camper housing 30 by conventional means, such as an adhesive. The frame flange 48 is fully embedded in the other end of weather 42, whereby the frame 32 is fixedly secured to the housing 30. The weather stripping 42 is of substantially rigid construction and overhangs into channel 44, thereby providing a partial blockage therein.

As best seen in FIG. 3, the lip 28 provided in sidewall 12 is snap-fit into the channel 44 for releasably mounting the frame 10 on camper 30. The rear window 16 in cab 18 is identically constructed, assembled and mounted in the cab housing 50, and like numbering designates the identical parts. In like manner, therefore, the lip 26 is snap-fit into a channel 44, whereby the boot is releasably mounted between the cab 18 and camper 30.

While the boot may be fabricated of a number of different materials, rubber is a preferred material. It is a feature of the invention that the boot and mounting therefor do not inhibit window movement of either window 16 and 22. It is another feature of this invention that the boot is readily removable and replaceable.

It will thus be seen that the objects set forth above, among those made apparent from the preceding description, are efficiently attained and, since certain changes may be made in the above constructions without departing from the spirit and scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

What is claimed is:

1. A combination including a boot and frame windows of a cab/camper assembly of the type having a rear frame window in the cab and a corresponding front frame window in the forward wall of the camper, said boot comprising a frame including a continuous resiliently deformable side wall, said side wall defining an aperture corresponding respectively to said windows in said cab and said camper, said side wall terminating in respective opposite ends, said respective opposite ends each including a thickened resilient continuous lip, each of said lips being adapted to be snap-fit into a corresponding window frame for thereby mounting said boot between said cab and camper, each of said window frames including an exteriorly extending substantially U-shaped channel in which a respective lip of said boot is grippingly receivable whereby said boot may be easily mounted and dismounted.

2. The combination as claimed in claim 1, each of said channels being determined by a pair of upstanding flanges mounted on said corresponding frames.

3. The combination as claimed in claim 1, each of said U-shaped channels including a partial blockage therein.

* * * * *